(12) United States Patent
Hosaka

(10) Patent No.: US 12,485,994 B2
(45) Date of Patent: Dec. 2, 2025

(54) ELECTRICALLY ASSISTED BICYCLE

(71) Applicant: Panasonic Intellectual Property Management Co., Ltd., Osaka (JP)

(72) Inventor: Takaaki Hosaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 149 days.

(21) Appl. No.: 18/413,569

(22) Filed: Jan. 16, 2024

(65) Prior Publication Data
US 2024/0253732 A1    Aug. 1, 2024

(30) Foreign Application Priority Data

Jan. 31, 2023   (JP) ................................ 2023-013334

(51) Int. Cl.
*B62M 6/50*    (2010.01)
*B62J 45/414*  (2020.01)
*B62J 45/415*  (2020.01)
*B62L 1/00*    (2006.01)

(52) U.S. Cl.
CPC .............. *B62M 6/50* (2013.01); *B62J 45/414* (2020.02); *B62J 45/415* (2020.02); *B62L 1/00* (2013.01)

(58) Field of Classification Search
None
See application file for complete search history.

(56) References Cited

U.S. PATENT DOCUMENTS

2017/0151999 A1*  6/2017  Kinpara ................ B62K 21/26
2018/0257743 A1*  9/2018  Tsuchizawa .......... B62J 45/415

FOREIGN PATENT DOCUMENTS

| FR | 2768991 A1 * | 4/1999 | ............ B62M 6/55 |
| JP | H092370 A  * | 1/1997 | ............ B60L 50/20 |
| JP | 2017-100541 A | 6/2017 | |

* cited by examiner

*Primary Examiner* — Daniel L Greene
(74) *Attorney, Agent, or Firm* — Renner, Otto, Boisselle & Sklar, LLP

(57) ABSTRACT

It is an object of the present disclosure to prevent backward movement of a bicycle on an uphill slope, the backward movement not being intended by a user. An electrically assisted bicycle according to an example of embodiments includes a controller, a second mode operational element, a brake unit, and an acceleration sensor. The controller controls the brake unit based on vehicle inclination angle information acquired by the acceleration sensor in a predetermined time period immediately preceding a time at which an operation of the second mode operational element is stopped.

12 Claims, 8 Drawing Sheets

ELECTRICALLY ASSISTED BICYCLE

CROSS REFERENCE TO RELATED APPLICATION

This application claims priority to Japanese Patent Application No. 2023-013334 filed on Jan. 31, 2023, which is incorporated herein by reference in its entirety including the specification, claims, drawings, and abstract.

TECHNICAL FIELD

The present disclosure relates to an electrically assisted bicycle.

BACKGROUND

Conventionally, electrically assisted bicycles for assisting in pedaling to enhance a human-powered drive force with motor power have been known. Further, electrically assisted bicycles having a function to assist in push walking the bicycle have been suggested (see, for example, Patent Document 1). An electrically assisted bicycle disclosed in Patent Document 1 is equipped with a controller capable of executing a first mode in which a motor applies no torque to a wheel, a second mode in which the motor applies a stay assisting torque to the wheel, and a third mode in which the motor applies a push walk assisting torque to the wheel. Further, in the electrically assisted bicycle described in Patent Document 1, each of the modes is selectable by a user operation.

CITATION LIST

Patent Literature

Patent Document 1: JP 2017-100541 A

The electrically assisted bicycle disclosed in Patent Document 1 can be easily held at a position where it is, by operating an operational element to select the second mode while a user is push walking the bicycle. On the other hand, upon occurrence of backward movement of the bicycle that is unintended by the user, such backward movement of the electrically assisted bicycle of Patent Document 1 may not be swiftly suppressed in some cases. For example, in a case where the user accidentally releases their finger from the operational element used for generating push walk assisting power while the user is push walking the bicycle on an uphill slope, the backward movement of the bicycle cannot immediately be suppressed.

SUMMARY

An object of the present disclosure is to swiftly suppress, on an uphill slope, backward movement of a bicycle that is not intended by a user.

In an aspect of the present disclosure, an electrically assisted bicycle equipped with an electric motor includes a controller configured to switchably implement a first mode in which a first assist driving force output from the electric motor is additionally used for cycling along with a human powered driving force based on a pedaling force applied to a pedal, and a second mode in which a second assist driving force output from the electric motor is additionally used for push walking the bicycle along with a pushing force applied to a vehicle body or used for self-propulsion of the bicycle, a second mode operational element configured to transmit to the controller a signal for activating the second mode, and a brake unit configured to apply a braking force to suppress backward movement of the vehicle body, in which the controller is further configured to control the brake unit based on vehicle inclination angle information acquired in a predetermined time period immediately preceding a time at which an operation of the second mode operational element is stopped.

In another aspect of the present disclosure, an electrically assisted bicycle equipped with an electric motor includes a controller configured to switchably implement a first mode in which a first assist driving force output from the electric motor is additionally used for cycling along with a human powered driving force based on a pedaling force applied to a pedal, and a second mode in which a second assist driving force output from the electric motor is additionally used for push walking the bicycle along with a pushing force applied to a vehicle body or used for self-propulsion of the bicycle, a second mode operational element configured to transmit to the controller a signal for activating the second mode, and a brake unit configured to apply a braking force to suppress backward movement of the vehicle body, in which the controller is further configured to control the brake unit based on vehicle inclination angle information acquired in a predetermined time period immediately preceding a time at which a vehicle speed or a rotation speed of the electric motor falls below a predetermined value after an operation of the second mode operational element is stopped.

In a further aspect of the present disclosure, an electrically assisted bicycle equipped with an electric motor includes a controller configured to switchably implement a first mode in which a first assist driving force output from the electric motor is additionally used for cycling along with a human powered driving force based on a pedaling force applied to a pedal, and a second mode in which a second assist driving force output from the electric motor is additionally used for push walking the bicycle along with a pushing force applied to a vehicle body or used for self-propulsion of the bicycle, a second mode operational element configured to transmit to the controller a signal for activating the second mode, a brake unit configured to apply a braking force to suppress backward movement of the vehicle body, and an inclination sensor configured to acquire vehicle inclination angle information, in which the controller is further configured to control the brake unit based on vehicle inclination angle information acquired at a time at which an operation of the second mode operational element is stopped.

In the electrically assisted bicycle according to the present disclosure, backward movement of the bicycle that is unintended by a user can be swiftly suppressed on an uphill slope. For example, while a user is push walking the electrically assisted bicycle on the uphill slope, the electrically assisted bicycle is able to precisely detect a possibility that unintended backward movement of the bicycle will occur, and swiftly apply the braking force to suppress the backward movement of the bicycle.

BRIEF DESCRIPTION OF DRAWINGS

Embodiments of the present disclosure will be described based on the following figures, wherein.

DESCRIPTION OF EMBODIMENTS

Hereinafter, embodiments of an electrically assisted bicycle according to the present disclosure will be explained in detail with reference to the drawings. The embodiments described below are presented merely by way of illustration, and the present disclosure is not limited to the below-described embodiments. In addition, it is to be understood that the present disclosure embraces any forms obtained by selectively combining two or more embodiments and/or modification examples described below.

Figure 1:
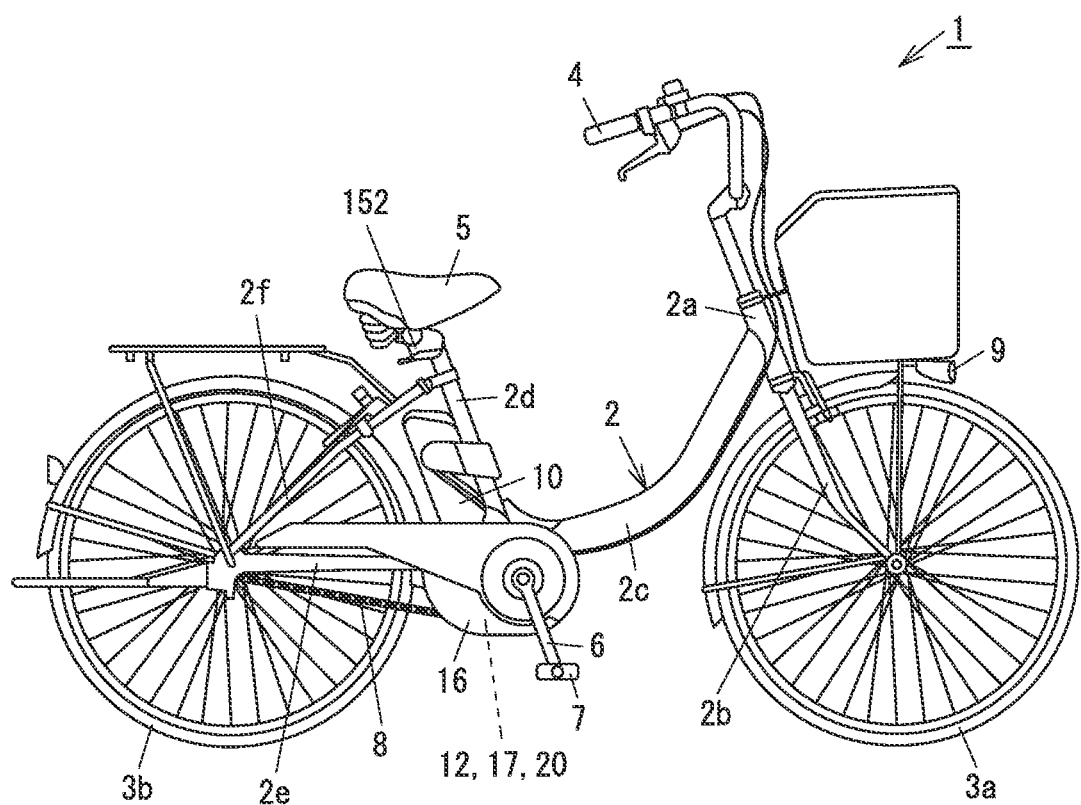
FIG. 1 is a side view of an electrically assisted bicycle according to an example of an embodiment in a first, rideable state.
Figure 2:
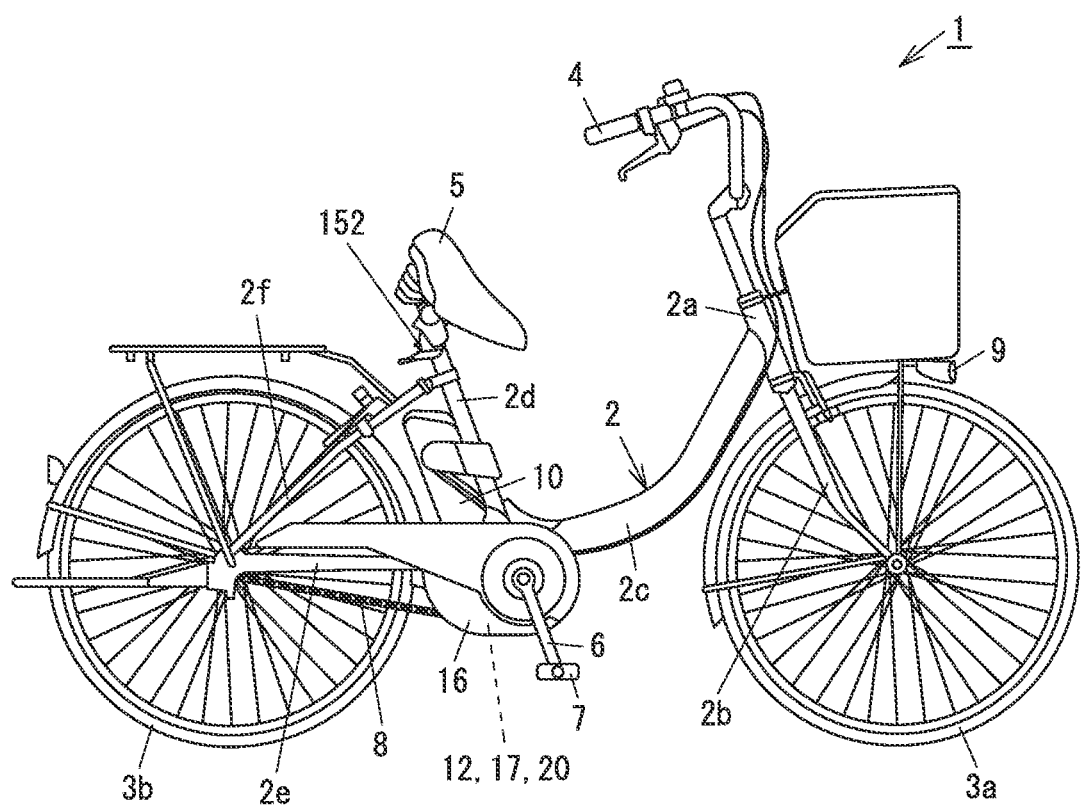
FIG. 2 is a side view of the electrically assisted bicycle in a second, not-rideable state.

FIGS. 1 and 2 are side views of an electrically assisted bicycle 1 according to an example of an embodiment. FIG. 1 shows a first state in which the electrically assisted bicycle 1 is rideable, and FIG. 2 shows a second state in which the electrically assisted bicycle 1 is not rideable. In the following description, terms representing front and rear, top and bottom, and left and right directions are used for the sake of explanation, and the front, rear, top, bottom, left, and right sides of the electrically assisted bicycle 1 and each component refer to those in a normal usage state. The front direction denotes a travel direction of the traveling electrically assisted bicycle 1.

As shown in FIGS. 1 and 2, the electrically assisted bicycle 1 includes a motor unit 16 equipped with an electric motor 17. The electrically assisted bicycle 1 includes a battery 10, and the electric motor 17 is driven by electric power supplied from the battery 10. The electrically assisted bicycle 1 further includes a brake unit 12 and a controller 20. The brake unit 12 applies a braking force to suppress backward movement of a vehicle body when a braking condition is satisfied. The controller 20 switchably implements a first mode in which a first assist driving force output from the electric motor 17 is additionally used for cycling along with a human powered drive force based on a pedaling force applied to a pedal 7, and a second mode in which a second assist driving force output from the electric motor 17 is additionally used for push walking the bicycle along with a pushing force applied to the vehicle body, or is used for self-propulsion of the bicycle.

The first mode is a cycling mode in which the first assist driving force output from the electric motor 17 is added to the human powered driving force based on the pedaling force applied to the pedal 7. Typically, the first mode is also referred to as a travel assist mode. The second mode is a mode in which the second assist driving force output from the electric motor 17 is used for push walking the electrically assisted bicycle 1 along with a pushing force applied to the vehicle body, or is used for self-propelling the electrically assisted bicycle 1. That is, the second mode includes a push walk mode and a self-propulsion mode. In the push walk mode, when a user walks while pushing the electrically assisted bicycle 1, the second assist driving force is applied based on a force of pushing the vehicle body forward, to assist in forward movement of the vehicle body. In the self-propulsion mode, the second assist driving force is applied to assist in forward movement of the vehicle body which is self-propelled while supporting itself.

Hereinafter, the first mode may be referred to as a "travel assist mode", and the second mode may be referred to as a "push walk mode". As will be described in detail below, the push walk mode in this embodiment includes a powered push walk mode in which motive power is applied to a wheel to assist the user in push walking the vehicle body, a staying push walk mode in which a braking force is applied to the wheel by a function of the brake unit 12, and a free mode in which neither of push walk assisting power or the braking force is applied. In the electrically assisted bicycle 1, a transition from the free mode to the staying push walk mode is automatically performed without any user operation. In this way, backward movement of the bicycle that is not intended by the user can be swiftly suppressed while the user is push walking the bicycle.

The electrically assisted bicycle 1 includes, as in the case of a traditional bicycle, a frame 2, wheels (composed of a front wheel 3a and a rear wheel 3b), a handlebar 4, a saddle 5, crank arms 6, pedals 7, chains 8, a head lamp 9, and other components. A combination of the crank arm 6 and the pedal 7 attached to one end of the crank arm 6 is disposed on each of left and right sides of the electrically assisted bicycle 1, and the other ends of a pair of the crank arms 6 are coupled to each other via a crank shaft.

The electrically assisted bicycle 1 further includes a front sprocket which is rotated following rotation of the pedals 7 and a rear wheel sprocket disposed on the rear wheel 3b. The front sprocket is linked via the chain 8 to the rear wheel sprocket. In this embodiment, both the pedaling force exerted on the pedals 7 and the assist power generated by the electric motor 17 are transmitted through the chain 8 to the rear wheel 3b. It should be noted that the motor unit 16 may be of a single-shaft type in which a rotation force of the electric motor 17 is transmitted via a reduction gear or the like to the front sprocket, or may be of a two-shaft type in which the rotation force of the electric motor 17 is transmitted via the reduction gear or the like to an assist power output sprocket around which the chain 8 is placed.

The frame 2 is a skeleton framework which joins the front wheel 3a, the rear wheel 3b, the handlebar 4, the saddle 5, and other components together. The frame 2 composed of a plurality of pipes supports the battery 10 and the motor unit 16. In this embodiment, a head pipe 2a, a front fork 2b, a down pipe 2c, a seat pipe 2d, chain stays 2e, seat stays 2f, and a bottom bracket are arranged as the plurality of pipes. The bottom bracket is a pipe which connects the down pipe 2c, the seat pipe 3d, and the chain stays 2e.

The head pipe 2a supports the front fork 2b and the handlebar 4 in a state rotatable about the center axis of the head pipe 2a. The front fork 2b includes a pair of legs for rotatably supporting the front wheel 3a, and a steering column 4d (see FIG. 3) which extends upward from the top ends of the legs and is inserted through the head pipe 2a. Further, the handlebar 4 is attached to the top end of the steering column 4d. The down pipe 2c is designed to connect the head pipe 2a and the seat pipe 2d. The seat pipe 2d is designed to support the saddle 5.

Each of the chain stays 2e is a pipe which connects the seat stay 2f and the bottom bracket and extends from the rear end of the bottom bracket toward a rear part of the bicycle, and the chain stays 2e are disposed on left and right sides of the bicycle on a one-by-one basis so as to sandwich the rear wheel 3c from both sides thereof. The seat stays 2f are disposed, as in the case of the chain stays 2e, on left and right sides of the bicycle on the one-by-one basis so as to sandwich the rear wheel 3b from both sides thereof. The left and right seat stays 2f extend from an upper region of the seat pipe 2d to the radial center of the rear wheel 3b, and are respectively coupled to the left and right chain stays 2e at the radial center of the rear wheel 3b. The rear wheel 3b is rotatably secured to the rear ends of the chain stays 2e.

The electrically assisted bicycle 1 is equipped with a ride unit. In this embodiment, the ride unit includes the saddle 5 and a switcher 152 which supports the saddle 5. The saddle 5 is fixed via the switcher 152 to the seat pipe 2d. The switcher 152 switches a state of the saddle 5 between a first, rideable state in which the saddle 5 is in a normal position with a seat surface of the saddle 5 facing up (see FIG. 1), and a second state in which the saddle 5 is in an abnormal position with the seat surface of the saddle 5 facing forward (see FIG. 2). In the second state of the saddle 5, the rear end of the saddle 5 is lifted up to a position higher than the front end of the saddle 5, and the user is unable to sit on the saddle 5, i.e., unable to ride on the electrically assisted bicycle 1.

The switcher 152 is equipped with a ride unit state detector 13 (see FIGS. 4 and 5 which will be referenced below) configured to detect the state of the saddle 5. As will be explained in detail below, both a second mode activation condition and a braking condition for actuating the brake unit 12 include a condition that the ride unit is in the second state which does not allow the user to ride on the bicycle. The controller 20 actuates the brake unit 12, for example, when an operation of a push walk operational element 41 (see FIG. 3 and other drawings which will be referenced below) is stopped in the second state, provided that the bicycle is on a an uphill slope of a predetermined angle.

The ride unit state detector 13 is implemented, for example, by a magnetic proximity sensor configured to detect the position of a magnet attached to a movable member constituting a part of the switcher 152. Because the movable member equipped with the magnet is moved together with the saddle 5, a relative positional relationship between the magnet and the ride unit state detector 13 is accordingly changed. The ride unit state detector 13 may be configured to output no detection signal when the magnet is in a reference position (in which the saddle 5 is in the first state) and output a detection signal when the saddle 5 is in the second state. In this case, the ride unit state detector 13 detects the second state of the saddle 5.

Figure 3:
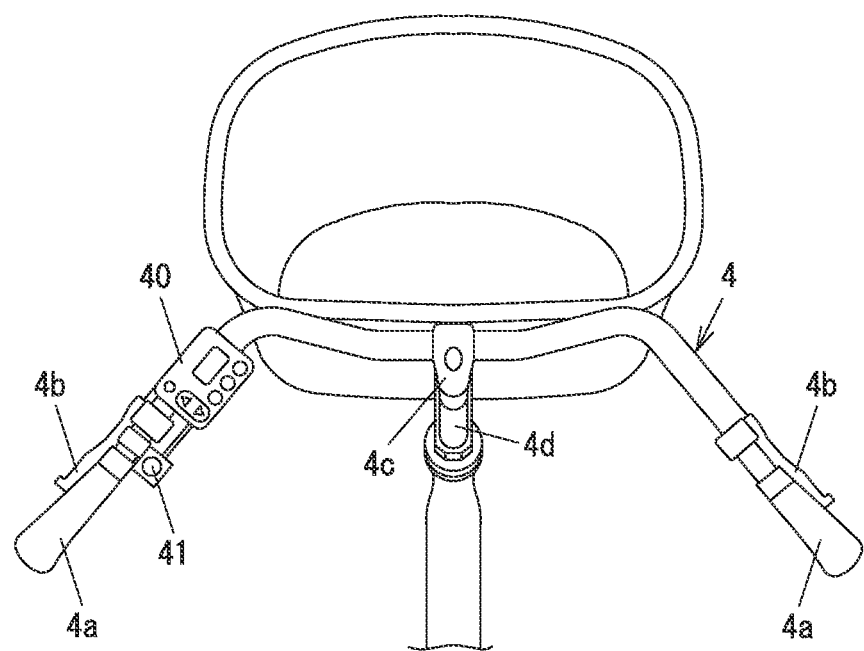
FIG. 3 is a diagram showing a handlebar of the electrically assisted bicycle and components in the vicinity of the handlebar.

FIG. 3 is an enlarged view showing the handlebar 4 and its surroundings.

As shown in FIG. 3, each of both ends of the handlebar 4 is provided with a grip 4a and a brake lever 4b. Further, the steering column 4d is joined via a stem 4c to the center of the handlebar 4. The handlebar 4 is a lift up handlebar with the grip 4a located at a position higher than the stem 4c. The handlebar 4 has an approximately U letter shape when viewed from above, and both left and right end regions of the handlebar 4 extend toward the rear of the bicycle and are spaced from each other toward the outside of the bicycle while approaching left and right terminal ends, respectively.

The grip 4a is a member to be gripped by the user when cycling or push walking the electrically assisted bicycle 1. The brake lever 4b is an operational element for actuating a brake attached to the wheel. In general, the brake lever 4b located on the left side is configured to operate the brake mounted on the rear wheel 3b, and the brake lever 4b located on the right side is configured to operate the brake mounted on the front wheel 3a. Upon an occurrence of backward movement of the bicycle that is unintended by the user who is push walking the bicycle, the backward movement can be prevented by an operation of the brake lever 4b, although it may be difficult in some cases for the user to rapidly perform such a lever operation. In the electrically assisted bicycle 1, because the transition to the staying push walk mode described above is automatically performed to apply the braking force to the wheel through the function of the brake unit 12, the backward movement can be rapidly suppressed in those difficult cases.

A switch unit 40 and the push walk operational element 41 are attached to the handlebar 4. The switch unit 40, which is also generally referred to as a hand switch, is attached to the handlebar 4 in the vicinity of the grip 4a on the left side of the handlebar 4. In this embodiment, the push walk operational element 41 is disposed between the switch unit 40 and the grip 4a. Although the push walk operational element 41 is connected to the switch unit 40 by a cable, the push walk operational element 41 need not necessarily be connected to the switch unit 40 and may be integrated into the switch unit 40. A structure for mounting the switch unit 40 and the push walk operational element 41 on the handlebar 4 is not specifically limited.

The switch unit 40 includes, for example, a power switch, an assist changeover switch, a head lamp switch, and a display. The power switch is an operational element to activate the controller 20. When the power switch is turned on, the travel assist mode and the push walk mode are activated. The assist changeover switch includes, for example, an UP button and a DOWN button for regulating a rate of assist power output from the electric motor 17 relative to the human powered drive force. An example of the display is a liquid crystal monitor. Remaining battery power, a bicycle operation mode, a time of day, and other items may be displayed on the display.

The push walk operational element 41 is a second mode operational element for implementing the push walk mode (second mode) and is operated by the user. For this reason, the push walk operational element 41 is placed in the vicinity of the grip 4a in terms of maneuverability during push walk. The push walk operational element 41 transmits to the controller 20 a signal for executing the push walk mode, in response to a user operation. Although there is no particular limitation to the form of the push walk operational element 41, a switch of a push button type is used as the push walk operational element 41 in this embodiment.

The push walk operational element 41 is, for example, a momentary switch which outputs an operation signal while it is being pressed by the user. When the push walk operational element 41 is not pressed, no signal is output, and thus the push walk mode is not executed. In other words, at a time when an operation of the push walk operational element 41 is stopped, the push walk mode is terminated, and the power to assist in the push walk is accordingly cut off.

Figure 4:
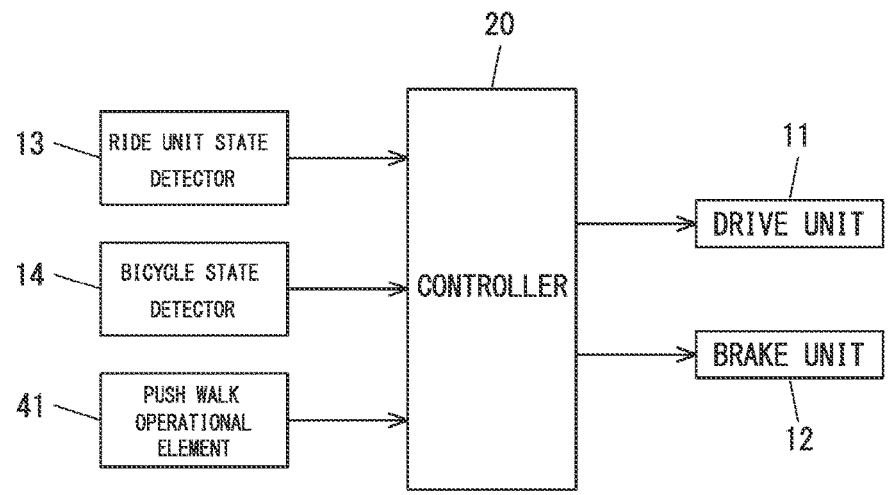
FIG. 4 is a block diagram showing a basic configuration of the electrically assisted bicycle.

FIG. 4 is a block diagram showing a basic configuration of the electrically assisted bicycle 1 in connection with the push walk mode (second mode).

As shown in FIG. 4, the electrically assisted bicycle 1 includes a drive unit 11, the brake unit 12, the ride unit state detector 13, a bicycle state detector 14, and the push walk operational element 41. The electrically assisted bicycle 1 further includes the controller 20 which controls the drive unit 11 and the brake unit 12. The controller 20 acquires detection information from each detector and controls the drive unit 11 and the brake unit 12 based on the acquired detection information. Upon reception of an operation signal from the push walk operational element 41, the controller 20 executes the push walk mode in which the drive unit 11 is operated to output the second assist driving force. In this embodiment, while the button of the push walk operational element 41 is being pressed by a finger of the user, contacts of switching elements constituting a part of the push walk operational element 41 are connected to each other to output the operation signal.

The drive unit 11 is an electric motor for outputting push walk assisting power. Although the electric motor may be an independent motor separated from a motor used for the travel assist mode, the same electric motor 17 may be used for both the travel assist mode and the push walk mode. The electric motor 17 (drive unit 11) may be any electric motor capable of driving the electrically assisted bicycle 1 to travel with electric power supplied from the battery 10, and a preferable example of such an electric motor is a three-phase brushless motor.

The brake unit 12 is a device for applying a braking force to the wheel, and is automatically actuated under the control of the controller 20 when a predetermined braking condition is satisfied. The brake unit 12 may be an electronically controlled brake or an electro-magnetic brake, for example. In terms of cost reduction and body weight reduction, for example, it is preferable to use the electric motor 17 as the brake unit 12. The braking method in this case may include a regenerative braking method and a short-circuit braking method. In the present embodiment, the braking force is applied to the rear wheel 3b.

The ride unit state detector 13 is configured, as described above, to be able to detect whether the saddle 5 is in a sittable position. In this embodiment, when the saddle 5 is in the second state being a not-sittable position, the ride unit state detector 13 outputs a detection signal. A transition to the push walk mode is exclusively allowed in the second state. In the second state, the controller 20 shifts the bicycle operation mode to the push walk mode when the ride unit state detector 13 detects the second state of the saddle 5 and the push walk operational element 41 is operated. On the other hand, when the saddle 5 is in the first state, the push walk operational element 41 is disabled.

In this embodiment, when an operation of pushing the push walk operational element 41 is performed, the free mode is shifted to a powered push walk mode, and the powered push walk mode is maintained as long as the push walk operational element 41 is being pressed, i.e., the operation signal continues to be output. When the operation of pressing the push walk operational element 41 is stopped, the bicycle operation mode is shifted from the powered push walk mode to the free mode, and further shifted to the staying push walk mode when a predetermined braking condition for actuating the brake unit 12 is satisfied.

The bicycle state detector 14 is configured to be able to detect the state of the electrically assisted bicycle 1. The bicycle state detector 14 functions to detect, for example, whether the electrically assisted bicycle 1 is in a state of satisfying the predetermined braking condition. The electrically assisted bicycle 1 includes, as a component of the bicycle state detector 14, at least an acceleration sensor 35 (see FIG. 5 which will be referenced below). As will be described in detail below, the controller 20 controls the brake unit 12 based on vehicle inclination angle information in a predetermined time period immediately preceding a time at which the operation of the push walk operational element 41 is stopped. The vehicle inclination angle information may be acquired from the acceleration sensor 35. Alternatively, the vehicle inclination angle information may be acquired from a gyro sensor or an inclination sensor, for example.

Figure 5:
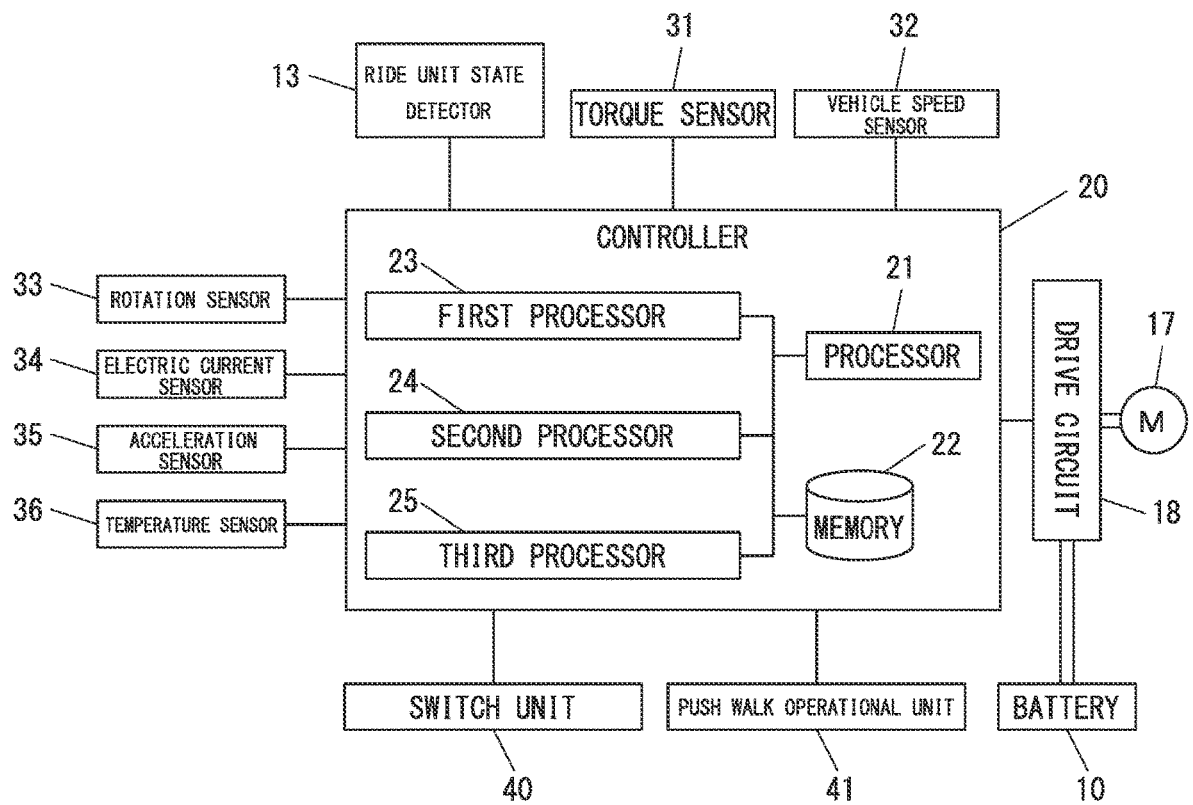
FIG. 5 is a block diagram showing a specific example of a configuration of the electrically assisted bicycle.

FIG. 5 is a block diagram showing a specific example of a configuration of the electrically assisted bicycle 1. Hereinafter, the specific example of the configuration of the electrically assisted bicycle 1, and in particular, the configuration in connection with the push walk mode, will be explained in detail with reference to examples of the above-described detectors.

As shown in FIG. 5, the controller 20 is connected to various sensors, operational elements, a drive circuit 18 for the electric motor 17, and other components. The controller 20 is implemented by a micro-computer equipped with, for example, a processor 21, a memory 22, an input/output interface, and other components, and is housed together with the drive circuit 18 and other components on a printed board. The controller 20 includes a first processor 23 configured to execute the travel assist mode, a second processor 24 configured to execute the powered push walk mode, and a third processor 25 configured to execute the staying push walk mode.

The push walk mode according to the present embodiment includes the powered push walk mode, the staying push walk mode, and the free push walk mode (see FIG. 6 which will be referenced below), and the controller 20 is configured to execute the above-described three operation modes. The bicycle operation mode is shifted from the powered push walk mode via the free push walk mode to the staying push walk mode.

The processor 21 implements the function of each of the above-described processors by reading and executing a control program. The memory 22 includes a non-volatile memory, such as a ROM, a HDD, or an SSD, for storing the control program, information on a variety of settings, for example, and a volatile memory, such as a RAM. In general, the controller 20 is incorporated into the motor unit 16. It should be noted that the motor unit 16 incorporates, in addition to the electric motor 17 and the controller 20, a speed reducer, a one way clutch, various sensors, the drive circuit 18, and other components.

The controller 20 is configured to be able to receive the operation signal output from the push walk operational element 41 and control the electric motor 17 based on the received operation signal. The controller 20 has a function of controlling the electric motor 17 to output the second assist driving force to assist the user in push walking the bicycle. This function is performed by the second processor 24. However, even though the operation signal is received from the push walk operational element 41, the controller 20 does not allow execution of the powered push walk mode to thereby prohibit output of the second assist drive force in a case where no detection information is received from the ride unit state detector 13.

The electrically assisted bicycle 1 includes a torque sensor 31 and a vehicle speed sensor 32. The torque sensor 31 is incorporated into the motor unit 16, for example, and detects a pedaling load acting on a crank shaft. The vehicle speed sensor 32 detects a vehicle speed from a rotation speed of the wheel. The controller 20 has a function of controlling, in the travel assist mode, an output of the electric motor 17 based on the vehicle speed and a torque (the pedaling load) acting on the crank shaft. This function is performed by the first processor 23. In this embodiment, the controller 20 outputs a control signal to the drive circuit 18, and an amount of electric current supplied to the electric moto 17 is changed through switching operation of the drive circuit 18 based on the control signal. In this way, the output of the electric motor 17 is controlled.

The electrically assisted bicycle 1 includes the acceleration sensor 35 as described above. The electrically assisted bicycle 1 may further include at least one sensor selected from a rotation sensor 33, an electric current sensor 34, and a temperature sensor 36. The sensors may be utilized as the bicycle state detector 14 which is used to determine transition to the staying push walk mode. Alternatively, the torque sensor 31 and the vehicle speed sensor 32 may be used as the bicycle state detector 14.

The rotation sensor 33 detects the rotation speed of the electric motor 17. When the electrically assisted bicycle 1 moves backward, the electric motor 17 is rotated in a direction opposite to a rotation direction in a case of forward movement. For this reason, the detection information from the rotation sensor 33 may be used to control the brake unit 12. The electric current sensor 34 detects the amount of electric current supplied to the electric motor 17. Detection information acquired from the electric current sensor 34 can be used to determine an output level of the electric motor 17. The temperature sensor 36 detects, for example, the temperature of the electric motor 17. The temperature of the electric motor 17 can be utilized as a brake releasing condition for terminating application of the braking force from the brake unit 12. A configuration may be such that the temperature sensor 36 detects the temperature of the drive circuit 18 or the battery 10, and the detected temperature is utilized as the brake releasing condition.

For example, a three-axis acceleration sensor is used for the acceleration sensor 35, while a two-axis acceleration sensor may be used for the acceleration sensor 35. The acceleration sensor 35 may be any sensor capable of detecting at least accelerations in a forward direction of the vehicle body and in a gravitational direction. When the three-axis sensor is used as the acceleration sensor 35, for example, the acceleration sensor 35 is set in such a manner that the acceleration in the forward direction of the vehicle body is measurable on the X axis of the three-axis sensor, and the acceleration in the gravitational direction is measurable on the Z axis of the sensor. Here, an acceleration in the lateral direction of the vehicle body is not used in control of the brake unit 12. As will be described in detail below, an inclination angle of the vehicle body can be found from the accelerations in the forward direction of the vehicle body and in the gravitational direction that are detected by the acceleration sensor 35.

The acceleration sensor 35 is mounted on the motor unit 16. Specifically, the acceleration sensor 35 is housed on the printed board incorporating the controller 20. In this case, the acceleration sensor 35 is protected from being damaged and can detect the acceleration precisely. However, the mounting location of the acceleration sensor 35 is not limited to the motor unit 16. The acceleration sensor 35 may be mounted on the switch unit 40 or mounted on another component, such as the saddle 5, the head lamp 9, or a locking device.

The electrically assisted bicycle 1 may be equipped with a notification device for notifying actuation of the brake unit 12 and thus the braking force being applied. The notification device, under the control of the controller 20, notifies the user of the situation where the braking force is being applied to the wheel. This allows the user to stand still while the braking force is being applied or to perform an operation for releasing the braking force, which leads to improved usability. It should be noted that the notification device may output to its surrounding environment a notification notifying that the braking force is being applied.

The notification device may be any device capable of providing the notification to the user and is not specifically limited to a particular configuration. Therefore, the switch unit 40 may be used as the notification device. For example, the duration of the staying push walk mode may be displayed on a monitor of the switch unit 40, and the duration may be displayed in a counting down manner. Alternatively, the notification device (switch unit 40) may be configured to issue, using a sound or light, the notification notifying application of the braking force. Specifically, the issuing of the notification may include outputting information on application of the braking force and the duration thereof by voice and causing the lamp to flash, for example.

The controller 20 is configured to have a function of actuating the brake unit 12 to suppress the backward movement when the predetermined braking condition is satisfied. This function is performed by the third processor 25. In this embodiment, the electric motor 17 is used as the brake unit 12 to apply a braking force onto the rear wheel 3b that is obtained by regenerative braking or short-circuit braking. In a case where the braking force is obtained by regenerative braking, it becomes necessary for electric power generated by the regenerative braking to be charged into the battery 10. With this in mind, regenerative braking and short-circuit braking may be selectively utilized depending on a chargeable battery capacity.

Figure 6:
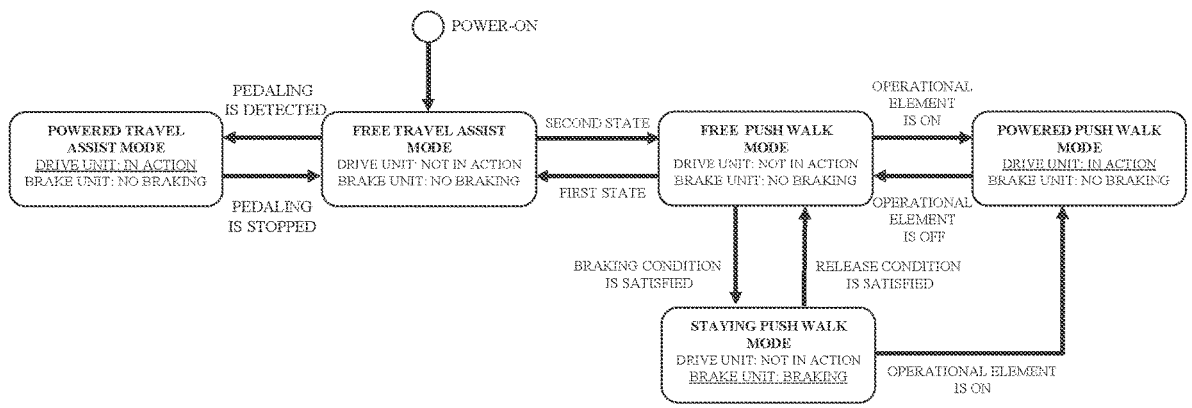
FIG. 6 is a diagram showing an example of state transition in the electrically assisted bicycle.

FIG. 6 shows an example of state transitions (operation mode transitions) in the electrically assisted bicycle 1.

As shown in FIG. 6, when the controller 20 is activated by turning on a power switch, the bicycle operation mode transitions to the free travel assist mode in a case where the saddle 5 is in the first state, or an error is detected to thereby prohibit generation of the driving force from the electric motor 15 in a case where the saddle 5 is in the second state. After the error is detected, the operation mode transitions to the free travel assist mode when the saddle 5 is set to the first state. The controller 20 is able to determine, based on the detection information from the ride unit state detector 13, whether the saddle 5 is in the first state or the second state.

Alternatively, a destination mode to which the bicycle operation mode transitions when the controller 20 is activated by turning on the power switch may be varied depending on the state of the saddle 5. In this case, the controller 20 causes a transition of the bicycle operation mode to the free travel assist mode, or the free push walk mode based on the state of the saddle 5. The travel assist mode includes the free travel assist mode in which the electric motor 17 is halted to thereby generate no assist power, and the powered travel assist mode in which the electric motor 17 is driven to generate assist power. Further alternatively, the bicycle operation mode may be shifted, regardless of the state of the saddle 5, to the free travel assist mode in response to activation of the controller 20.

For example, upon detection of pedaling, the operation mode of the electrically assisted bicycle 1 transitions from the free travel assist mode to the powered travel assist mode. Specifically, the transition to the powered travel assist mode is triggered when the torque sensor 31 detects a human powered drive force (a pedaling load) which is generated by pedaling. Then, the powered travel assist mode is shifted to the free travel assist mode when the pedaling is halted. It should be noted that in the powered travel assist mode, the brake unit 12 applies no braking force.

In the example shown in FIG. 6, whenever the saddle 5 is in the first state, the bicycle operation mode is not shifted from the travel assist mode to the push walk mode. In addition, whenever the saddle 5 is in the second state, the push walk mode does not transition to the travel assist mode.

The controller 20 operates the electric motor 17, which is the drive unit 11, to generate the second assist driving force used as power to assist in push walking as long as the operation signal is received from the push walk operational element 41. In this case, the operation mode of the electrically assisted bicycle 1 is the powered push walk mode. In this mode, because motive power of the electric motor 17 is applied to the rear wheel 3b to assist in push walking, the user can easily push walk the bicycle even on an uphill slope. When the operation signal from the push walk operational element 41 is interrupted, the controller 20 halts the electric motor 17 and shifts the operation mode from the powered push walk mode to the free push walk mode.

In the free push walk mode, the controller 20 automatically actuates the brake unit 12 in a case where the bicycle is located on an uphill slope at the time when the operation of the push walk operational element 41 is stopped. In this case, the operation mode of the electrically assisted bicycle 1 transitions to the staying push walk mode. The controller 20 determines whether the bicycle is on the uphill slope where the brake unit 12 should be actuated, i.e., whether the braking condition is satisfied, based on vehicle inclination angle information acquired from the acceleration sensor 35 in a predetermined time period immediately preceding the time at which the operation of the push walk operational element 41 is stopped.

Automatically actuating the brake unit 12 means that the brake unit 12 is actuated to apply the braking force not based on a user operation but based on the determination by the controller 20. In this embodiment, as described above, the electric motor 17 is used to actuate a regenerative brake or a short-circuit brake (hereinafter, the regenerative and short-circuit brakes are simply referred to as a "brake" when there is no necessity to distinguish therebetween). It should be noted that even if the bicycle moves backward during operation of the push walk operational element 41, the transition to the staying push walk mode is not performed.

The controller 20 activates the brake when the bicycle is located on an uphill slope having a gradient greater than or equal to a predetermined value at the time at which an operation of the push walk operational element 41 is stopped, regardless of whether the vehicle body has moved backward. A gradient of the uphill slope, or more precisely an inclination angle of the vehicle body, can be obtained based on the detection information from the acceleration sensor 35. The controller 20 actuates the brake unit 12 to apply the braking force to the wheel, for example, when a representative value of inclination angles of the vehicle body acquired using the acceleration sensor 35 exceeds a threshold value. The threshold value may be arbitrarily defined, and may be set to 6 degrees, for example.

The braking force applied by the brake unit 12 may be variable depending on the inclination angle of the vehicle body or other factors, or may be increased as the inclination angle becomes greater. Alternatively, the braking force may be increased as the output of the electric motor 17 becomes greater or the vehicle speed becomes slower immediately before the braking condition is satisfied. The brake unit 12 may be configured to change the braking force based on at least one value selected from the inclination angle of the vehicle body, and the motor output and the vehicle speed immediately before the braking condition is satisfied.

The controller 20 may continue application of the braking force for a predetermined duration of time. In other words, once the staying push walk mode is activated, the staying mode is maintained for the predetermined duration of time. The predetermined duration of time may be set to a short duration in a range capable of providing an effect of suppressing bicycle's backward movement. Then, the notification device notifies the predetermined duration of time to continue the staying push walk mode. A specific example of such notification may include displaying a remaining duration of time to continue the stationary push walk stay mode on the monitor of the switch unit 40.

The controller 20 terminates application of the braking force when a predetermined brake releasing condition is satisfied in the staying push walk mode. The controller 20 terminates application of the braking force when at least one condition is satisfied, the at least one condition being selected from, for example, conditions that the push walk operational element 41 is operated, a predetermined release operation is performed, a predetermined length of time has elapsed since the braking force was applied, the electric motor 17 is halted for a predetermined length of time, the vehicle speed exceeds a predetermined value, and the acceleration exceeds a predetermined value. Then, the controller 20 shifts the bicycle operation mode from the staying push walk mode to the free push walk mode.

The controller 20 may terminate application of the braking force when the predetermined duration of time to continue the staying push walk mode has elapsed. In this case, because the staying push walk mode is automatically released, the release operation by the user is not needed. Alternatively, a particular release operation to release the braking force may be specified, and the controller 20 may terminate application of the braking force upon receipt of an operation signal indicative of the particular release operation performed by the user.

When the electric motor 17 is halted for the predetermined length of time, the controller 20 may determine that the release condition is satisfied and release the brake accordingly. The controller 20 can determine the state of the electric motor 17 from its rotation speed measured by the rotation sensor 33. In a case where the halted state of the electric motor 17 is maintained for a predetermined length of time in the staying push walk mode, because application of the braking force to suppress the backward movement is no longer required, it is preferable that the staying push walk mode is released.

When the vehicle speed exceeds the predetermined value, the controller 20 may determine that the release condition is satisfied and release the brake accordingly. Alternatively, the controller 20 may release the brake in the staying push walk mode, provided that the acceleration exceeds the predetermined value. In either case, when the bicycle moves forward against the braking force of the brake, i.e., when the user walks while pushing the bicycle, the staying push walk mode is shifted to the free push walk mode. When the user applies a force to move the bicycle forward, because there is no necessity of maintaining the braking force to suppress the backward movement, the brake should be released to allow the user to smoothly push walk the bicycle.

The controller 20 may determine, when the push walk operational element 41 is operated, that the release condition is satisfied, and accordingly release the brake and shift the bicycle operation mode from the staying push walk mode to the powered push walk mode. In other words, when the operation signal is received from the push walk operational element 41 in the staying push walk mode, the controller 20 operates the electric motor 17 to generate the assist power and effects a transition to the powered push walk mode without passing through the free push walk mode. In this way, even when the push walk operational element 41 is accidentally released from user's finger during a push walk, resulting in backward movement of the bicycle, the powered push walk mode can be smoothly resumed simply by operating the push walk operational element 41 again.

The controller 20 may terminate application of the braking force when the temperature of the electric motor 17 detected by the temperature sensor 36 exceeds a predetermined threshold value. In other words, the temperature of the electric motor 17 is considered as the brake releasing condition. When the electric motor 17 is used to generate the braking force, there may be a case where the electric motor 17 overheats. In such a case, it is preferable to terminate application of the braking force in light of protection of devices and other factors. In place of or in addition to the temperature of the electric motor 17, a temperature of the drive circuit 18, a temperature of the battery 10, or a temperature indirectly indicating these temperatures may be taken into consideration.

Typically, the electrically assisted bicycle 1 further includes a battery state detector for detecting the state of the battery 10. An example of the battery state detector is a voltage sensor which detects a voltage of the battery 10. The controller 20 calculates a charged rate of the battery 10 (remaining battery power), for example, based on the voltage of the battery 10 detected by the voltage sensor. In the staying push walk mode, the controller 20 may use the short-circuit brake when the charged rate of the battery 10 exceeds a predetermined threshold value and use the regenerative brake when the charged rate matches or falls below the predetermined threshold value, to thereby charge the battery 10 with electric power generated through the use of the regenerative brake.

Figure 7:
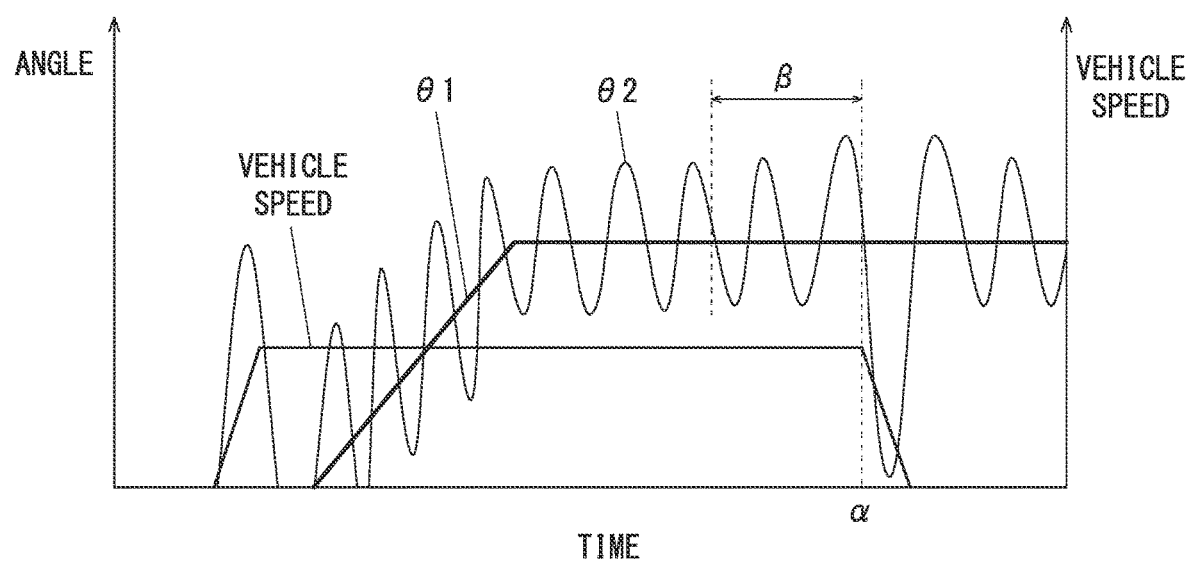
FIG. 7 is a diagram for explaining a method for acquiring a vehicle inclination angle using an acceleration sensor.

FIG. 7 is a diagram for explaining a method for acquiring the inclination angle of the vehicle body using the acceleration sensor 35 and representing a relationship among the vehicle speed, an actual vehicle inclination angle $\theta 1$, and a vehicle inclination angle $\theta 2$ acquired using the acceleration sensor 35, with respect to time plotted on the horizontal axis.

FIG. 7 shows the vehicle speed and the vehicle inclination angles $\theta 1$ and $\theta 2$ in a situation where the electrically assisted bicycle 1 is moved from a rest position on a flat road and push walked on an uphill slope, and subsequently stopped at a certain location on the uphill slope. In the example shown in FIG. 7, it is assumed that the push walk operational element 41 is operated to generate power to assist in push walking and shift the bicycle operation mode to the powered push walk mode, and thereafter the powered push walk mode is terminated on an uphill slope when the push walk operational element 41 is accidentally released from user's finger. In this case, the brake unit 12 is automatically actuated in the electrically assisted bicycle 1, which can swiftly suppress backward movement of the vehicle body that is not intended by the user. Whether the brake unit 12 should be actuated, i.e., whether the braking condition is satisfied is determined based on the vehicle inclination angle $\theta 2$ which is acquired using the acceleration sensor 35.

The controller 20 controls the brake unit 12 based on vehicle inclination angle information acquired from the acceleration sensor 35 in a predetermined time period $\beta$ immediately preceding a time $\alpha$ at which the operation of the push walk operational element 41 is stopped. The controller 20 determines, for example, at the time of interruption of the operation signal from the push walk operational element 41, whether the braking condition is satisfied, based on the vehicle inclination angle information, and when the braking condition is determined as being satisfied, the controller 20 actuates the brake unit 12 to apply the braking force to the wheel. In other words, the brake unit 12 is actuated on the premise (on the condition) that the push walk operational element 41 has been operated.

The controller 20 actuates the brake unit 12 when the vehicle inclination angle $\theta 2$ in the predetermined time period $\beta$ immediately preceding the time $\alpha$ at which the operation of the push walk operational element 41 is stopped exceeds the threshold value. The vehicle inclination angle $\theta 2$ varies greatly depending on increases/decreases in the vehicle speed, even when the actual inclination angle $\theta 1$ is not changed. For this reason, it is preferable to use a numerical value obtained immediately before the operation stopped time $\alpha$. In this way, the brake unit 12 can be controlled based on more accurate information.

The vehicle inclination angle information denotes information about an inclination angle of the vehicle body that is acquired using the acceleration sensor 35. The vehicle inclination angle information may be, for example, an average value of vehicle inclination angles $\theta 2$ acquired in the predetermined time period $\beta$, while information linked with the vehicle inclination angle $\theta 2$ may be used as the vehicle inclination angle information, and the accelerations themselves in the forward direction of the vehicle body and in the gravitational direction detected by the acceleration sensor 35 may be used. However, when the accelerations are utilized, without being processed, for controlling the brake unit 12, it is necessary that a relationship between the acceleration and the actual body inclination angle $\theta 1$ be previously identified, and an appropriate acceleration threshold value be set.

The vehicle inclination angle $\theta 2$ can be calculated using both an acceleration X in the forward direction of the vehicle body and an acceleration Z in the gravitational direction that are detected by the acceleration sensor 35, with the following equation:

$$\text{Equation: } \theta 2 = \arctan(X/Z)$$

For example, the controller 20 receives detection information (accelerations X and Z) from the acceleration sensor 35 and calculates the vehicle inclination angle $\theta 2$ using the above-described equation. The controller 20 may always calculate the vehicle inclination angle $\theta 2$, or may start to calculate the vehicle inclination angle $\theta 2$ at the time of receiving the operation signal from the push walk operational element 41. As an alternative configuration, the acceleration sensor 35 or another computation device may calculate the vehicle inclination angle $\theta 2$ and transmit the calculated result to the controller 20.

It should be noted that the vehicle inclination angle $\theta 2$ fluctuates in a certain range during a push walk even though the gradient of a road and the vehicle speed are substantially unchanged. Therefore, the vehicle inclination angle $\theta 2$ has an amplitude of a predetermined cycle. The amplitude of the vehicle inclination angle $\theta 2$ has a cycle equal to or less than 0.1 seconds, for example, and is increased at a time of acceleration/deceleration of the bicycle. For this reason, when values of the vehicle inclination angle $\theta 2$ (accelerations X and Z) are used to control the brake unit 12, it is preferable to not use values of the vehicle inclination angle $\theta 2$ acquired during deceleration.

The controller 20 may control the brake unit 12 based on the vehicle inclination angle information acquired by the acceleration sensor 35 in a predetermined time period immediately preceding a time at which the vehicle speed or the rotation speed of the electric motor 17 falls below a predetermined value. The time of determining based on the vehicle inclination angle information whether the braking condition is satisfied may be set to a time at which the vehicle speed or the rotation speed of the electric motor 17 falls below the predetermined value, rather than the time at which the operation of the push walk operational element 41 is stopped.

The vehicle inclination angle information may be an representative value of vehicle inclination angles θ2 acquired in the predetermined period β immediately preceding the time α at which the operation of the push walk operational element 41 is stopped, or in the predetermined period β immediately preceding the time at which the vehicle speed or the rotation speed of the electric motor 17 falls below the predetermined value after the operation of the push walk operational element 41 is stopped. As the representative value of the vehicle inclination angles θ2, at least one value selected from an average value, a median value, a mode value, a maximum value, and a minimum value may be used. Among the values, the average value of the vehicle inclination angles θ2 may be preferably used. It should be noted that the average value is not limited to an arithmetic mean, and may be a weighted mean. The brake unit 12 can be controlled with a higher degree of precision through the use of the average value of the vehicle inclination angles θ2 acquired in the predetermined period β, which can allow precise and prompt application of the braking force.

The controller 20 may actuate the brake unit 12 to apply the braking force when the representative value of the vehicle inclination angles θ2 exceeds the threshold value as described above. In other words, the braking condition is satisfied when the representative value of the vehicle inclination angles θ2 exceeds the threshold value. That is, even though the bicycle is halted after the push walk operational element 41 is operated at a location on an uphill slope, the braking condition is not satisfied, and thus the brake unit 12 is not actuated as long as the uphill slope is a gentle slope corresponding to the representative value of the vehicle inclination angles θ2 less than or equal to the threshold value. In this way, the brake unit 12 can be controlled with a high degree of accuracy. It should be noted that the threshold value may be defined as appropriate based on the type of the representative value to be used. For example, when the average value is used as the representative value, the threshold value is set to 6 degrees.

The predetermined time period β is defined, for example, to be greater than or equal to a length of time corresponding to one cycle of the amplitude of the vehicle inclination angle θ2, and in particular a length of time corresponding to two cycles. Here, it is considered that when the predetermined time period β is excessively long, the actual inclination angle θ1 will change. Therefore, an upper limit is set for the predetermined time period β, with reference to the length of the bicycle, the vehicle speed during a push walk, and other factors. For example, the predetermined time period β may be greater than or equal to 0.1 seconds and less than or equal to 1 second, and may be, in particular, greater than or equal to 0.2 seconds and less than or equal to 0.5 seconds. When the predetermined time period β for which the representative value, such as the average value, of the vehicle inclination angles θ2 is calculated is in the above described range, it can be ensured that the brake unit 12 is precisely and swiftly controlled based on more accurate information.

The controller 20 may be configured to calculate the cycle of the amplitude of the vehicle inclination angle θ2. In this case, the predetermined time period β may be defined based on the calculated cycle of the amplitude of the vehicle inclination angle θ2.

Figure 8:
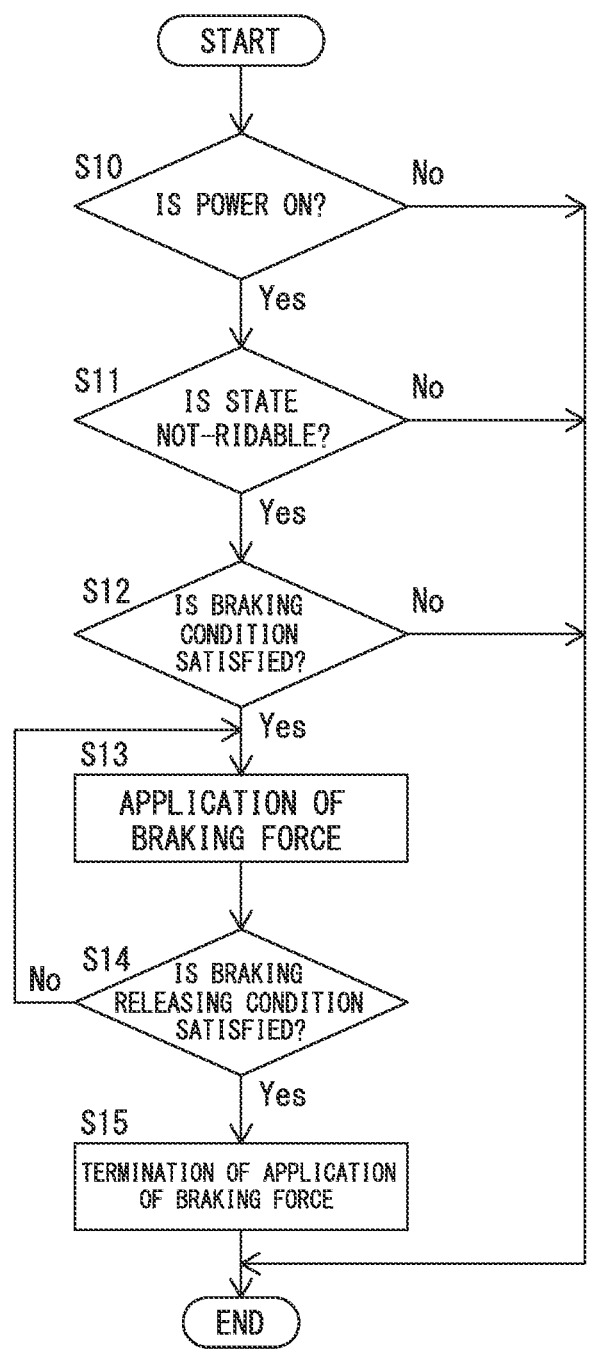
FIG. 8 is a flowchart showing an example of a basic control procedure for suppressing backward movement of the electrically assisted bicycle.

FIG. 8 is a flowchart showing an example of a basic control process in the push walk mode.

As shown in FIG. 8, when the controller 20 is in an activated state after the power switch is turned on (Yes in step S10), the operation mode of the electrically assisted bicycle 1 is set to the push walk mode on the condition that the saddle 5 is in the second state (not-rideable state) (Yes in step S11). The state of the saddle 5 is determined based on the detection information from the ride unit state detector 13. In the second state of the saddle 5 with the seat facing forward, a detection signal is output from the ride unit state detector 13, and the controller 20 determines the not-rideable state upon reception of the detection signal. When the saddle 5 is in the first state, the operation mode is set to the travel assist mode without transitioning to the push walk mode.

When the predetermined braking condition is satisfied in the push walk mode (Yes in step S12), the brake unit 12 is actuated to apply the braking force onto the wheel (step S13). The controller 20 actuates the brake and shifts the operation mode to the staying push walk mode when the braking condition is satisfied. In the staying push walk mode, when the predetermined brake releasing condition is satisfied (Yes in step S14), the controller 20 releases the brake to terminate application of the braking force (step S15). It should be noted that the staying push walk mode is maintained until a release condition is satisfied.

In the staying push walk mode, for example, the controller 20 displays on the monitor of the switch unit 40 a remaining time to apply the braking force in a counting down manner. Then, at the time when the remaining time reaches zero, the brake is released. In this way, because application of the braking force is maintained for a predetermined length of time while the remaining time is notified, it becomes easy for the user to take appropriate action, such as holding the brake lever 4b or pressing the push walk operational element 41, before the brake is released. The controller 20 releases the brake and shifts the operation mode to the free push walk mode in step S15.

Figure 9:
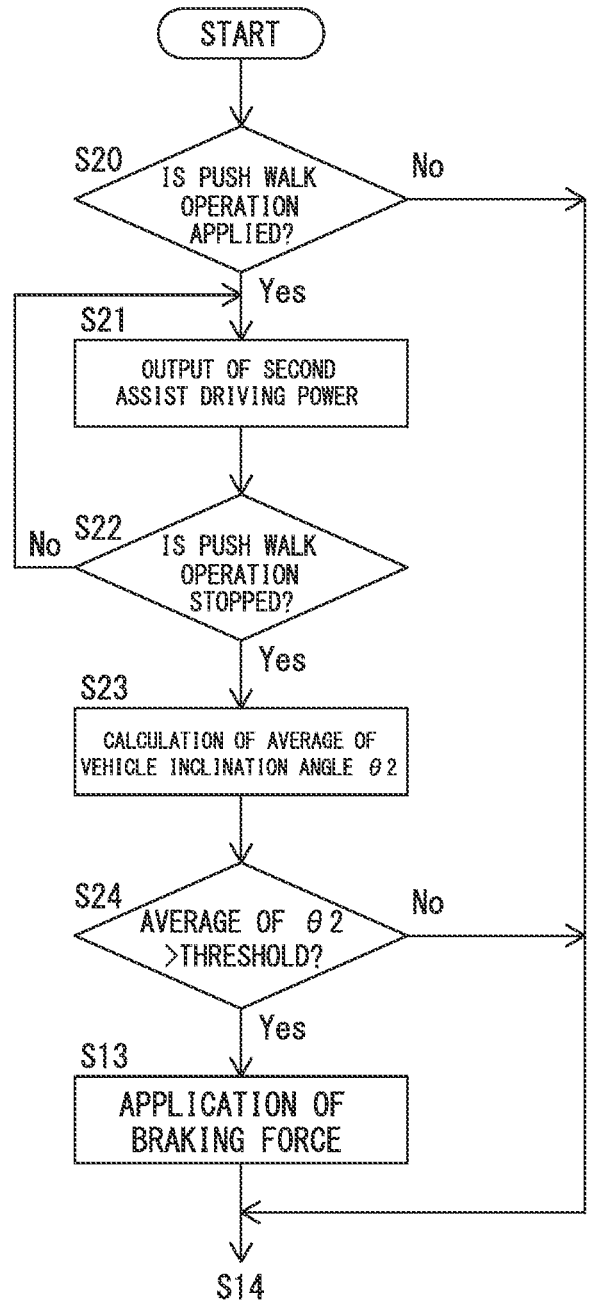
FIG. 9 is a flowchart showing a specific example of the control procedure for suppressing backward movement of the electrically assisted bicycle.

FIG. 9 is a flowchart showing an example of a determination process for the braking condition. In FIG. 9, the same process steps as those shown in FIG. 8 are designated by the same reference signs.

As shown in FIG. 9, when the push walk operational element 41 is operated in the push walk mode (Yes in step S20), the controller 20 actuates the electric motor 17 to generate the second assist driving force (step S21). As a result, the bicycle operation mode transitions from the free push walk mode to the powered push walk mode. Then, the powered push walk mode is maintained as long as the push walk operational element 41 is operated and the operation signal is received.

When reception of the operation signal from the push walk operational element 41 is interrupted (Yes in step S22), the controller 20 calculates the vehicle inclination angle θ2 from the accelerations X and Z detected by the acceleration sensor 35 (step S23). In step S23, it is preferable to calculate the average value of the vehicle inclination angles θ2 in the predetermined time period β immediately preceding the time α at which the operation of the push walk operational element 41 is stopped, i.e., the time when the operation signal is interrupted. Here, the vehicle inclination angles θ2 may be constantly calculated, and in step S23, the average value may be calculated from the constantly calculated vehicle inclination angles θ2.

In step S24, the controller 20 compares the average value of the vehicle inclination angles θ2 with the threshold value. When the average value of the vehicle inclination angles θ2 exceeds the threshold value (Yes in step S24), the controller 20 determines that the braking condition is satisfied and applies the braking force (step S13). In other words, the controller 20 actuates the brake and shifts the operation mode to the staying push walk mode on condition that the bicycle is located on an uphill slope having a gradient greater than the threshold value when the operation signal of the push walk operational element 41 is interrupted.

As has been described, according to the above-described configuration of the electrically assisted bicycle 1, when the push walk operational element 41 is accidentally released from a finger of the user who is push walking the bicycle on an uphill slope, the brake unit 12 is automatically actuated to swiftly suppress backward movement of the vehicle body that is not intended by the user. The controller 20 may actuate the brake unit 12 based on the average value of the vehicle inclination angles θ2 acquired by the acceleration sensor 35 in the predetermined time period β immediately preceding the time α at which the operation of the push walk operational element 41 is stopped. In this case, an accurate and speedy measure can be taken to counter a situation where the vehicle body can move backward in a manner that the user does not intend.

Other than the modification examples described above, various design modifications of the above-described embodiment may be made without impairing purposes of the present disclosure. For example, the electrically assisted bicycle according to this disclosure may include an operational element, such as a throttle, and have a self-propulsion mode in which a motor output is controlled based on a user's operation of the operational element. Further, a sensor which can detect a push walk of the bicycle may be provided. The sensor is installed in a grip of the handlebar, for example, and configured to measure a load exerted on the grip during the push walk or a distribution of such loads. In this case, the push walk is detected based on the load exerted on the grip or the distribution of such loads.

Further, in place of the switcher 152, a sensor for detecting a load exerted on the saddle 5 may be used to determine the rideable or not-rideable state. Still further, the state of the saddle 5 has been described as being switched between the first, rideable state and the second, not-rideable state in the above-described embodiment, although the state of a ride unit other than the saddle 5, such as the pedal or the handle, may be switched between the first state and the second state.

Moreover, the controller 20 may shift the bicycle operation mode to the push walk mode without determining the rideable or not-rideable state. For example, the controller 20 may cause a transition, from the free mode in which both the drive unit 11 and the brake unit 12 are not actuated, to the powered walk push mode in response to the operation signal from the push walk operational element 41, and a transition to the powered travel assist mode in response to detection of a pedaling action. In addition, when the pedaling action is detected in the staying push walk mode, the controller 20 may cause a direct transition to the powered travel assist mode. In this case, also in the rideable state (where the saddle 5 is in the first state), assist power can be output by operating the push walk operational element 41, and the brake unit 12 can be automatically activated.

Further, the vehicle inclination angle information used to determine whether or not the braking condition is satisfied may be acquired from, for example, a sensor, other than the acceleration sensor 35. The sensor other than the acceleration sensor 35 may include, for example, the gyro sensor and the inclination sensor as described above. Also, in a case where the vehicle inclination angle information is acquired from the gyro sensor, the brake unit 12 can be appropriately and precisely controlled using measurement values in the above-described predetermined time period β. On the other hand, when the vehicle inclination angle information is acquired from the inclination sensor, it is preferable to use a measurement value at the time α at which the operation of the push walk operational element 41 is stopped.

REFERENCE SIGNS LIST 1 electrically assisted bicycle, 2 frame, 2a head pipe, 2b front fork, 2c down pipe, 2d seat pipe, 2e chain stay, 2f seat stay, 3a front wheel, 3b rear wheel, 4 handlebar, 4a grip, 4b brake lever, 4c stem, 4d steering column, 5 saddle, 6 crank arm, 7 pedal, 8 chain, 9 head lamp, 10 battery, 11 drive unit, 12 brake unit, 13 ride unit state detector, 14 bicycle state detector, 16 motor unit, 17 electric motor, 18 drive circuit, 20 controller, 21 processor, 22 memory, 23 first processor, 24 second processor, 25 third processor, 31 torque sensor, 32 vehicle speed sensor, 33 rotation sensor, 34 electric current sensor, 35 acceleration sensor, 36 temperature sensor, 40 switch unit, 41 push walk operational element, 152 switcher.

The invention claimed is:

1. An electrically assisted bicycle equipped with an electric motor, comprising:
    a controller configured to switchably implement a first mode in which a first assist driving force output from the electric motor is additionally used for cycling along with a human powered driving force based on a pedaling force applied to a pedal, and a second mode in which a second assist driving force output from the electric motor is additionally used for push walking the bicycle along with a pushing force applied to a vehicle body or used for self-propulsion of the bicycle;
    a second mode operational element configured to transmit to the controller a signal for executing the second mode; and
    a brake unit configured to apply a braking force to suppress backward movement of the bicycle, wherein
    the controller is further configured to control the brake unit based on vehicle inclination angle information acquired in a predetermined time period immediately preceding a time at which a vehicle speed or a rotation speed of the electric motor falls below a predetermined value after an operation of the second mode operational element is stopped.

2. An electrically assisted bicycle equipped with an electric motor, comprising:
    a controller configured to switchably implement a first mode in which a first assist driving force output from the electric motor is additionally used for cycling along with a human powered driving force based on a pedaling force applied to a pedal, and a second mode in which a second assist driving force output from the electric motor is additionally used for push walking the bicycle along with a pushing force applied to a vehicle body or used for self-propulsion of the bicycle;

a second mode operational element configured to transmit to the controller a signal for activating the second mode;

a brake unit configured to apply a braking force for suppressing backward movement of the vehicle body; and an inclination sensor configured to acquire vehicle inclination angle information, wherein the controller is further configured to control the brake unit based on the vehicle inclination angle information acquired at a time at which an operation of the second mode operational element is stopped.

3. The electrically assisted bicycle according to claim 2, wherein the controller is configured to actuate the brake unit for applying the braking force when a value of the vehicle inclination angle information exceeds a threshold value.

4. An electrically assisted bicycle equipped with an electric motor, comprising:

a controller configured to switchably implement a first mode in which a first assist driving force output from the electric motor is additionally used for cycling along with a human powered driving force based on a pedaling force applied to a pedal, and a second mode in which a second assist driving force output from the electric motor is additionally used for push walking the bicycle along with a pushing force applied to a vehicle body or used for self-propulsion of the bicycle;

a second mode operational element configured to transmit to the controller a signal for executing the second mode; and a brake unit configured to apply a braking force to suppress backward movement of the bicycle, wherein the controller is further configured to control the brake unit based on vehicle inclination angle information acquired in a predetermined time period immediately preceding a time at which an operation of the second mode operational element is stopped.

5. The electrically assisted bicycle according to claim 4, further comprising:

an acceleration sensor or a gyro sensor, wherein the vehicle inclination angle information is acquired from the acceleration sensor or the gyro sensor.

6. The electrically assisted bicycle according to claim 4, wherein the vehicle inclination angle information is at least one representative value selected from an average value, a median value, a mode value, a maximum value, and a minimum value of vehicle inclination angles acquired in the predetermined time period.

7. The electrically assisted bicycle according to claim 6, wherein the controller is further configured to actuate the brake unit for applying the braking force when the representative value exceeds a threshold value.

8. The electrically assisted bicycle according to claim 7, wherein the representative value is the average value of the vehicle inclination angles acquired in the predetermined time period.

9. The electrically assisted bicycle according to claim 7, wherein the predetermined time period is greater than or equal to 0.1 seconds and less than or equal to 1 second.

10. The electrically assisted bicycle according to claim 7, wherein the brake unit applies the brake force for a predetermined time duration.

11. The electrically assisted bicycle according to claim 10, further comprising a notification device configured to notify that the braking force is being applied.

12. The electrically assisted bicycle according to claim 10, wherein the brake unit is configured to terminate application of the braking force when at least one condition is satisfied, the at least one condition selected from conditions that the second mode operational element is operated, a predetermined release operation is performed, a predetermined length of time has elapsed since the braking force was applied, the electric motor is halted for a predetermined length of time, a vehicle speed exceeds a predetermined value, and an acceleration exceeds a predetermined value.

* * * * *